July 7, 1970     G. H. GASS ET AL     3,518,971
CAGE FOR LABORATORY ANIMALS

Filed June 4, 1968     2 Sheets-Sheet 1

George H. Gass,
Charles A. Bunten,
Inventors.
Koenig, Senniger,
Powers and Leavitt,
Attorneys.

United States Patent Office 3,518,971
Patented July 7, 1970

3,518,971
CAGE FOR LABORATORY ANIMALS
George H. Gass and Charles A. Bunten, Carbondale, Ill., assignors to Southern Illinois University Foundation, Carbondale, Ill., a corporation of Illinois
Filed June 4, 1968, Ser. No. 734,464
Int. Cl. A01k 1/00
U.S. Cl. 119—18                            10 Claims

ABSTRACT OF THE DISCLOSURE

The animal cage disclosed herein is adapted to facilitate the changing of bedding material in the cage without handling animals confined therein. A meshlike grille is releasably secured across the open bottom of an open-bottomed enclosure and the enclosure with grille attached is then placed in a shallow tray holding bedding material. The tray is larger than the grille so that the enclosure rests on the bedding material itself. The bedding material will thus work up through the grille for use by animals in the enclosure. When the enclosure with grille attached is then removed from the tray, the animals are separated from the bedding material by the meshlike grille without being handled.

BACKGROUND OF THE INVENTION

This invention relates to a cage for laboratory animals and more particularly to such a cage which permits bedding material in the cage to be changed without handling animals confined therein.

In most prior art cages for laboratory animals, cleaning of the cage and changing of bedding material requires that the animals be transferred from the cage being cleaned to a previously cleaned cage or to a temporary cage while the cleaning is being performed. This practice necessitates handling of the animals and, in certain instances, handling of both the mother animal and her litter. The soiled cage is then cleaned of the bedding, feces, etc., and washed and sterilized. The procedure is typically unpleasant, time consuming and expensive. As it is preferable to clean the cages as frequently as twice a week, the expense in maintaining a substantial number of animals is appreciable. Further, handling of the animals can cause cross contamination of the animals by the person doing the handling after having handled animals from other cages. Cross infection is particularly a problem if the same temporary container is used to hold successive groups of animals as their respective cages are cleaned. Handling of recent offspring may also cause rejection by the mother.

In some proposed cage constructions no bedding as such is employed, but rather the animals are supported above an absorbent litter on a wire mesh screen. However, it has been found that direct contact with the wire mesh has adverse effects on the confined animals and may lead to loss of offspring. Further, since the animals are in direct contact with wire mesh, the mesh itself quickly becomes dirtied and must be cleaned frequently.

There has been, therefore, an unfulfilled need for a laboratory cage not subject to the shortcomings of such prior art cages and which will permit the bedding material in the cage to be changed without requiring the animals therein to be handled.

SUMMARY OF THE INVENTION

Among the several objects of the present invention may be noted the provision of a novel cage for laboratory animals which facilitates frequent cleaning and changing of bedding material; the provision of such a cage in which changing of bedding material can be accomplished without handling the confined animals; the provision of such a cage in which the confined animals are supported in contact with bedding material rather than by contact with wire mesh; the provision of such a cage which does not require frequent disassembly and separate cleaning; the provision of such a cage in which one or more elements thereof are disposable; the provision of such a cage which is easily assembled; the provision of such a cage which permits the confined animals to be easily observed; and the provision of such a cage which is of relatively simple and inexpensive construction. Other objects and features will be in part apparent and in part pointed out hereinafter.

Briefly, the present invention is directed to a cage for laboratory animals which comprises a tray for holding bedding material, an open-bottomed animals enclosure, a grille for the open bottom of the enclosure, the grille being removably secured across the bottom of the enclosure and the openings in the grille being sufficiently large for working of the bedding material therethrough but small enough for confinement of an animal, the enclosure and grille being so dimensioned relative to the tray that the enclosure with the grille across its bottom is adapted to be placed loosely in the tray with the grille bearing on top of the bedding material and pressed down to force the grille down into the bedding material with the latter working up through the openings in the grille, and the enclosure together with the grille being removable from the tray with attendant dropping out of bedding material from the enclosure through the openings in the grille.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
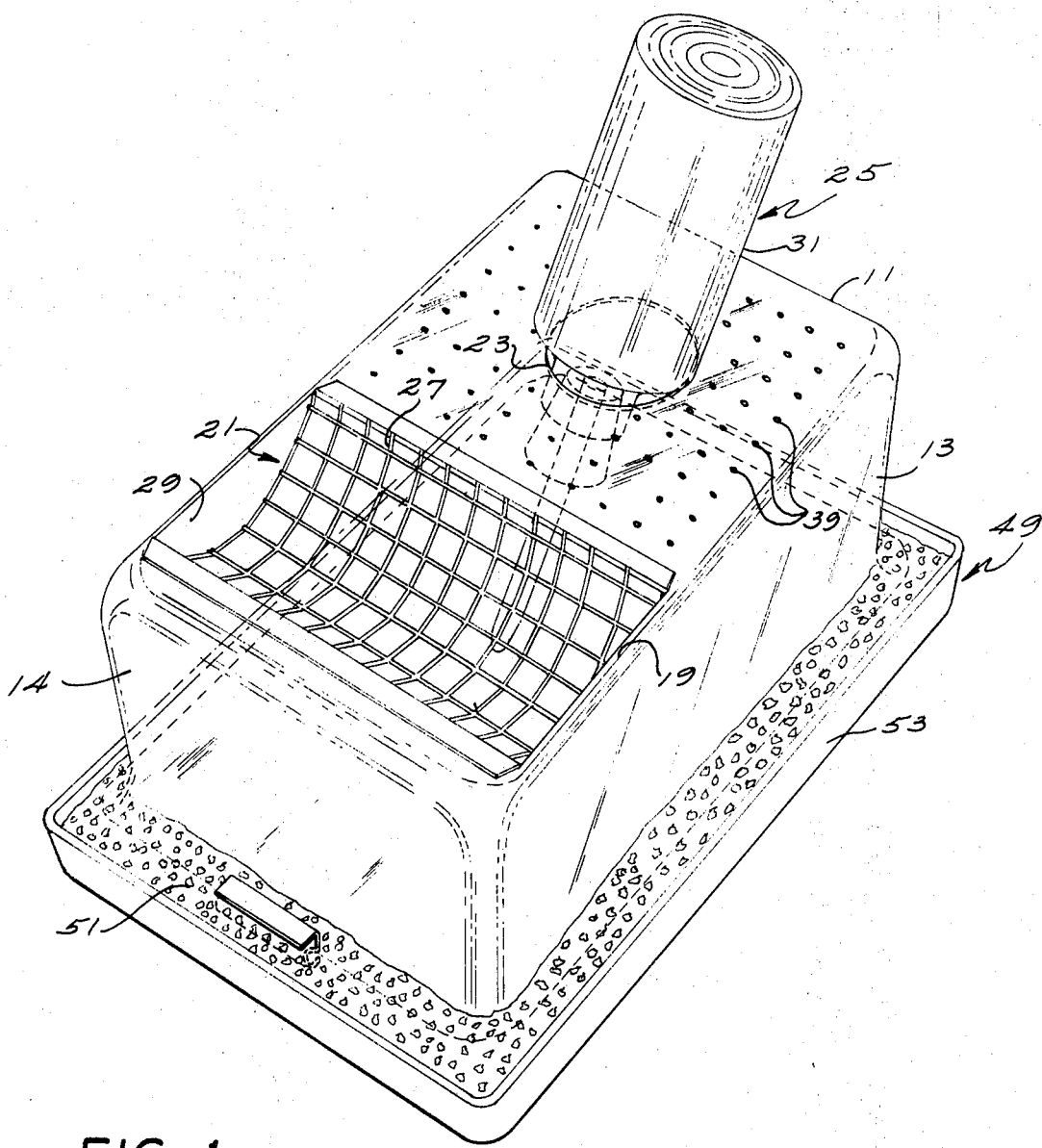
FIG. 1 is a view in perspective of a cage according to this invention.
Figure 2:
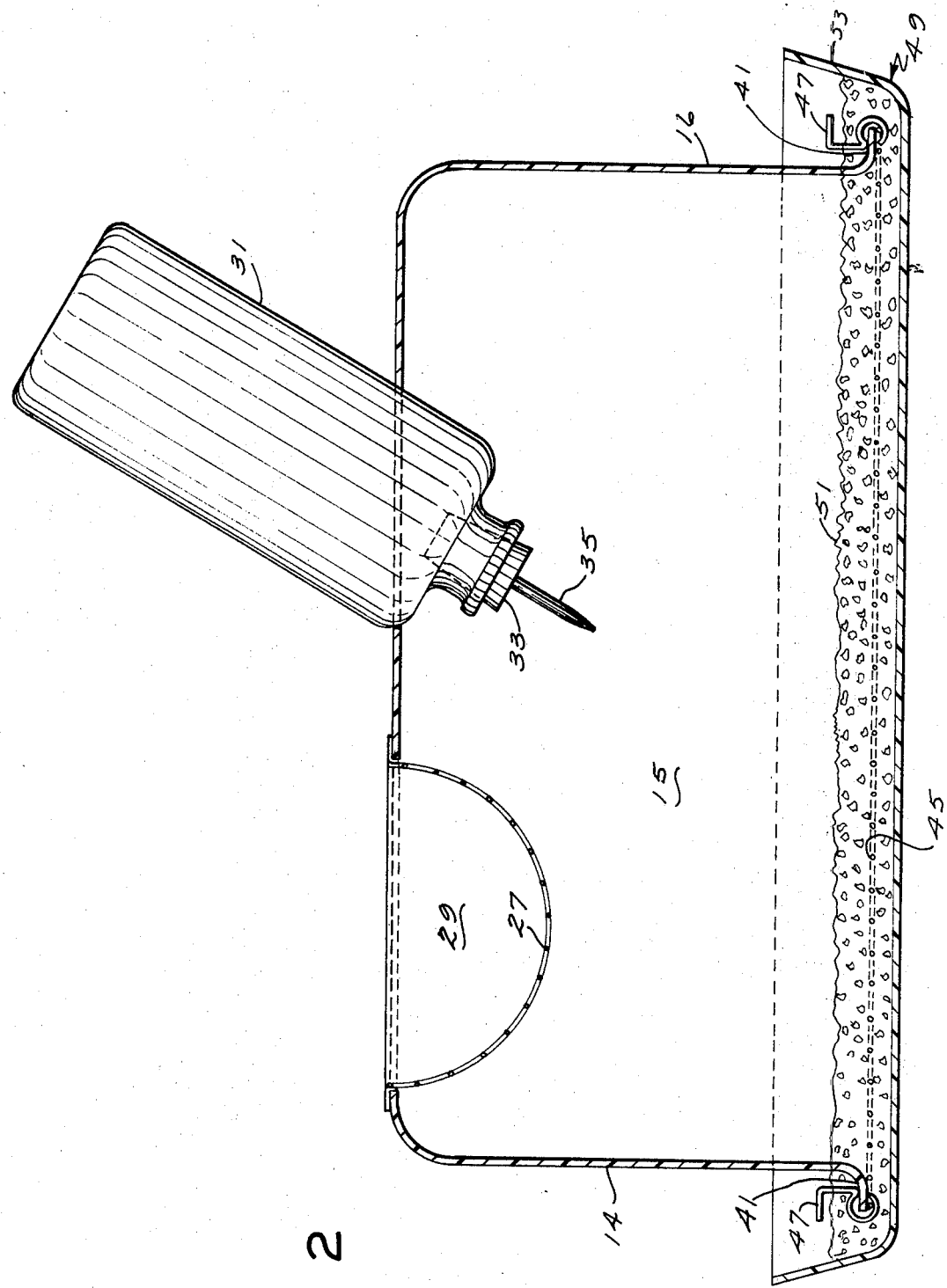
FIG. 2 is a longitudinal view through the cage of FIG. 1.

Referring now to the drawings, the cage of this invention is shown as comprising a transparent enclosure member 11 which is generally in the form of an open-bottomed box. The enclosure 11 may for example be formed by blow-molding a transparent synthetic plastic resin such as a vinyl resin. The sides of the enclosure 11, designated 13–16, are preferably flared slightly so that a plurality of such enclosures may be nested for compact storage. The top of the enclosure, designated 17, preferably includes an opening 19 for an animal feeder 21 and an opening 23 for an animal water bottle 25. As illustrated, feeder 21 comprises a semi-cylindrical trough 27 constructed of wire mesh, the trough being closed at each end by a metal plate 29. The water bottle 25 is illustrated as comprising an inverted glss bottle 31 the mouth of which is closed by a rubber stopper 33 through which is inserted a conventional capillary watering tube 35. The enclosure 11 is preferably perforate as indicated at 39 for providing an abundant fresh air supply to animals confined therein. The lower edge of the enclosure 11 terminates in an outwardly projecting lip 41.

The open bottom of the enclosure 13 is closed by a grille 45 constructed, for example, of wire mesh which is releasably secured across the open bottom of the enclosure by means of spring clips 47 which swing up from the ends of the wire mesh grille to engage the lip 41.

The enclosure 11 with grille 45 attached is placed in a shallow tray 49 containing a bedding material 51. Tray 49 is preferably constructed of a thin plastic resin sheet material. The bedding material 51 is preferably a loose particulate material, such as fine wood shavings or sugar beet pulp, which can pass through the openings in the wire mesh grille 45. The tray 49 is larger than the grille 45 and is so dimensioned that the enclosure 11 rests on the bedding material 51 and within tray 49 rather than on the side edges 53 of tray 49. Accordingly, the litter or bedding material 51 can work its way up through the openings in the mesh grille 45 and form a bedding floor for animals confined in the cage. Preferably the enclosure 11 is worked back and forth slightly as it is placed in the tray so that a substantial portion of the bedding material 51 will be forced up through grille 45. The wire mesh constituting grille 45 is chosen so that the openings therein are of a size which is large enough to facilitate working through of the bedding material but small enough to assure confinement of animals held in the cage.

Animals, such as mice or rats, can be placed in the enclosure either before the enclosure is placed in the tray 49 or afterwards through the feeder opening 19 which is preferably made large enough for this purpose. While confined in the cage, the animals are presented with a satisfactory floor surface comprising the bedding material 51 and have access to food and water. Furthermore, since the enclosure 11 is transparent, the growth and behavior of the animals can be easily observed, the view being substantially unobstructed on all sides except for the necessary feeder and watering bottle.

At desired intervals, the solid bedding may be easily replaced by merely transferring the enclosure 11 with bottom grille 45 attached to a new tray 53 containing fresh bedding material 51. When the enclosed 11 is lifted from the old tray, the animals contained therein are separated from the bedding material 51 without being handled since the bedding material drops out through the openings in the mesh grille 45. Thus, the danger of contamination and cross infection is substantially reduced. Further, since the wire mesh which comprises the grille 45 is effectively buried in the bedding material 51 during use, feces and waste feed do not become adhered to the wire mesh as they would if the wire mesh itself constituted the floor of the cage. Accordingly, the mesh grille 45 does not have to be cleaned as frequently as is the case with so-called hanging cages constructed of wire mesh in which the wire mesh constitutes the floor of the cage.

Since the trays 53 may be constructed inexpensively from thin plastic resin sheet material, they are preferably disposed of, e.g., by incineration, rather than being cleaned. Likewise, when the enclosure 11 finally becomes unacceptably dirty it too can be disposed of. However, it will be understood that the enclosure 11 will typically remain in satisfactory condition through a number of changings of the bedding material since the bedding material bears the brunt of the filth accumulation. Frequent changing of the litter tray 53 and the accumulated urine, feces, and waste food controls odor formation by preventing accumulation of food, droppings and odors which build up by spoilage and by shortening the time in which bacterial action of waste products can occur.

In summary, it can be seen that, because of the ease with which bedding material can be changed, the cage of the present invention facilitates a higher level of cleanliness than has heretofore been economically feasible while at the same time reducing cross contamination and loss of animal off spring through handling. The cage of the invention also makes possible a lessened incidence of infection in animals and offspring since mother and the offspring can remain in the cage enclosure until the offspring are weaned without necessity to remove the animals at periodic intervals for cage cleaning.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cage for laboratory animals comprising:
a tray for holding bedding material;
an open-bottomed animal enclosure;
a grille for the open bottom of said enclosure;
means for movably securing the grille in place across the bottom of the enclosure, the openings in said grille being sufficiently large for working of bedding material therethrough but small enough for confinement of an animal, said enclosure and said grille being so dimensioned relative to said tray that said enclosure with the grille across its bottom is adapted to be placed loosely in said tray with said grille bearing on top of the bedding material and pressed down to force the grille down into the bedding material, the latter working up through the openings in the grille, and the enclosure together with the grille being removable from the tray with attendant dropping out of bedding material from the enclosure through the openings in the grille.

2. A cage as set forth in claim 1 wherein said enclosure is formed of thin sheet material comprising a plastic resin.

3. A cage as set forth in claim 2 wherein said sheet material is substantially transparent.

4. A cage as set forth in claim 1 wherein said grille comprises a wire mesh.

5. A cage as set forth in claim 4 wherein said enclosure includes an outwardly projecting lip at the lowermost edge thereof and wherein said grille is provided with clips which are engageable with said lip for holding said grille across the open bottom of said enclosure.

6. A cage as set forth in claim 1 wherein said enclosure is perforate to provide air to animals confined therein.

7. A cage as set forth in claim 1 wherein said enclosure has an opening therein for a food dispenser.

8. A cage as set forth in claim 1 wherein said enclosure has an opening therein for an animal watering bottle.

9. A cage as set forth in claim 1 wherein said tray is formed of thin sheet material comprising a plastic resin.

10. A cage for laboratory animals comprising:
a tray constructed of a plastic material for holding bedding material;
a unitary open-bottomed animal enclosure constructed of a transparent plastic material;
a wire mesh grille for the open bottom of said enclosure;
means for removably securing the grille in place across the bottom of the enclosure, the openings in said grille being sufficiently large for working of bedding material therethrough but small enough for confinement of an animal, said enclosure and said grille being so dimensioned relative to said tray that said enclosure with the grille across its bottom is adapted to be placed loosely in said tray with said grille bearing on top of the bedding material and pressed down to force the grille down into the bedding material, the latter working up through the openings in the grille, and the enclosure together with the grille being removable from the tray with attendant dropping out of bedding material from the enclosure through the openings in the grille.

References Cited

UNITED STATES PATENTS

| | | | |
|---|---|---|---|
| 2,539,024 | 1/1951 | Leiby | 119—17 |
| 3,122,127 | 2/1964 | Shechmeister et al. | 119—18 |
| 3,195,505 | 7/1965 | Hauth et al. | 119—17 |
| 3,212,474 | 10/1965 | Higgins et al. | 119—18 |
| 3,334,614 | 8/1967 | Gass et al. | 119—18 |

HUGH R. CHAMBLEE, Primary Examiner